United States Patent
Feige

(10) Patent No.: US 8,439,316 B2
(45) Date of Patent: May 14, 2013

(54) SUPPORT COLLAR FOR LONG ARTICLES, IN PARTICULAR CABLES, PIPES AND/OR THE LIKE

(75) Inventor: Giorgio Feige, Segrate (IT)

(73) Assignee: FI.MO.TEC. S.p.A., Cologno Monzese (MI) (IT)

( * ) Notice: Subject to any disclaimer, the term of this patent is extended or adjusted under 35 U.S.C. 154(b) by 32 days.

(21) Appl. No.: 12/992,355

(22) PCT Filed: Jul. 22, 2010

(86) PCT No.: PCT/IT2010/000325
§ 371 (c)(1), (2), (4) Date: Nov. 12, 2010

(87) PCT Pub. No.: WO2010/143222
PCT Pub. Date: Dec. 16, 2010

(65) Prior Publication Data
US 2011/0226913 A1  Sep. 22, 2011

(30) Foreign Application Priority Data
Aug. 12, 2009 (IT) .............................. MI2009A1469

(51) Int. Cl.
*F16B 15/00* (2006.01)
*F16B 45/00* (2006.01)

(52) U.S. Cl.
USPC .............................. 248/71; 248/72; 248/74.1

(58) Field of Classification Search .................. 248/68.1, 248/62, 72, 63, 74.1, 71, 231.81
See application file for complete search history.

(56) References Cited

U.S. PATENT DOCUMENTS

| | | | | |
|---|---|---|---|---|
| 1,398,519 A * | 11/1921 | Hosch | ......................... | 248/316.7 |
| 2,166,916 A * | 7/1939 | Lombard | ......................... | 248/73 |
| 2,712,917 A * | 7/1955 | Flora et al. | ..................... | 403/397 |
| 3,444,596 A * | 5/1969 | Soltysik | ........................... | 248/73 |
| 3,536,281 A * | 10/1970 | Attore et al. | ..................... | 248/73 |
| 4,763,132 A * | 8/1988 | Juds et al. | ..................... | 343/890 |
| 4,958,792 A * | 9/1990 | Rinderer | ..................... | 248/74.2 |
| 5,967,468 A * | 10/1999 | Veghte et al. | .................... | 248/71 |
| 6,161,804 A * | 12/2000 | Paske et al. | .................. | 248/74.1 |
| 6,257,530 B1 * | 7/2001 | Tsai | ............................. | 248/74.2 |
| 6,354,543 B1 * | 3/2002 | Paske | ........................... | 248/68.1 |
| 6,460,813 B1 * | 10/2002 | Gretz | ............................. | 248/62 |
| 6,622,976 B1 * | 9/2003 | Ianello | ........................... | 248/73 |
| 6,899,305 B2 * | 5/2005 | Korczak et al. | .............. | 248/68.1 |

(Continued)

*Primary Examiner* — Nkeisha Smith
(74) *Attorney, Agent, or Firm* — Themis Law

(57) ABSTRACT

A support collar (1) for long articles (10), in particular cables, pipes and/or the like, comprises a sheet-like structure (2) provided with: a flat top end portion (4), having an opening (5); two side portions (6) perpendicular to the top end portion (4) and each having a respective engaging element (7) for engaging the support collar (1) on a support plate (8) or on a top end portion (4) of another support collar (1). The side portions (6) and the top end portion (4) delimit an area (9) for partially housing an article (10) to be supported. The collar (1) also comprises retaining means (11) for keeping the long article (10) stably joined to the sheet-like structure (2). The retaining means (11) comprise at least one retaining clip (12) provided with two gripping arms (13) which extend inside the housing area (9). The gripping arms (13) can be elastically splayed so as to engage with the long article (10) and retain the latter inside the housing area (9). The gripping arms (13) press elastically the article (10) in directions transverse to the longitudinal extension thereof.

15 Claims, 4 Drawing Sheets

U.S. PATENT DOCUMENTS

| | | | |
|---|---|---|---|
| 7,090,174 B2 * | 8/2006 | Korczak et al. | 248/61 |
| 7,097,142 B1 * | 8/2006 | Schmidt | 248/68.1 |
| 7,293,745 B2 * | 11/2007 | Catapano | 248/61 |
| 7,360,745 B2 * | 4/2008 | Nikayin et al. | 248/216.1 |
| 7,455,268 B2 * | 11/2008 | Heath | 248/74.1 |
| 7,556,225 B2 * | 7/2009 | Riedy et al. | 248/68.1 |
| 8,011,621 B2 * | 9/2011 | Korczak | 248/68.1 |
| 8,079,561 B2 * | 12/2011 | Jafari | 248/231.81 |
| 2002/0005463 A1 * | 1/2002 | Paske et al. | 248/74.1 |
| 2003/0089828 A1 * | 5/2003 | Korczak et al. | 248/68.1 |
| 2005/0109890 A1 * | 5/2005 | Korczak et al. | 248/74.1 |
| 2005/0211853 A1 * | 9/2005 | Whorton | 248/71 |
| 2006/0249633 A1 * | 11/2006 | Korczak et al. | 248/62 |
| 2009/0294602 A1 * | 12/2009 | Korczak | 248/74.2 |

* cited by examiner

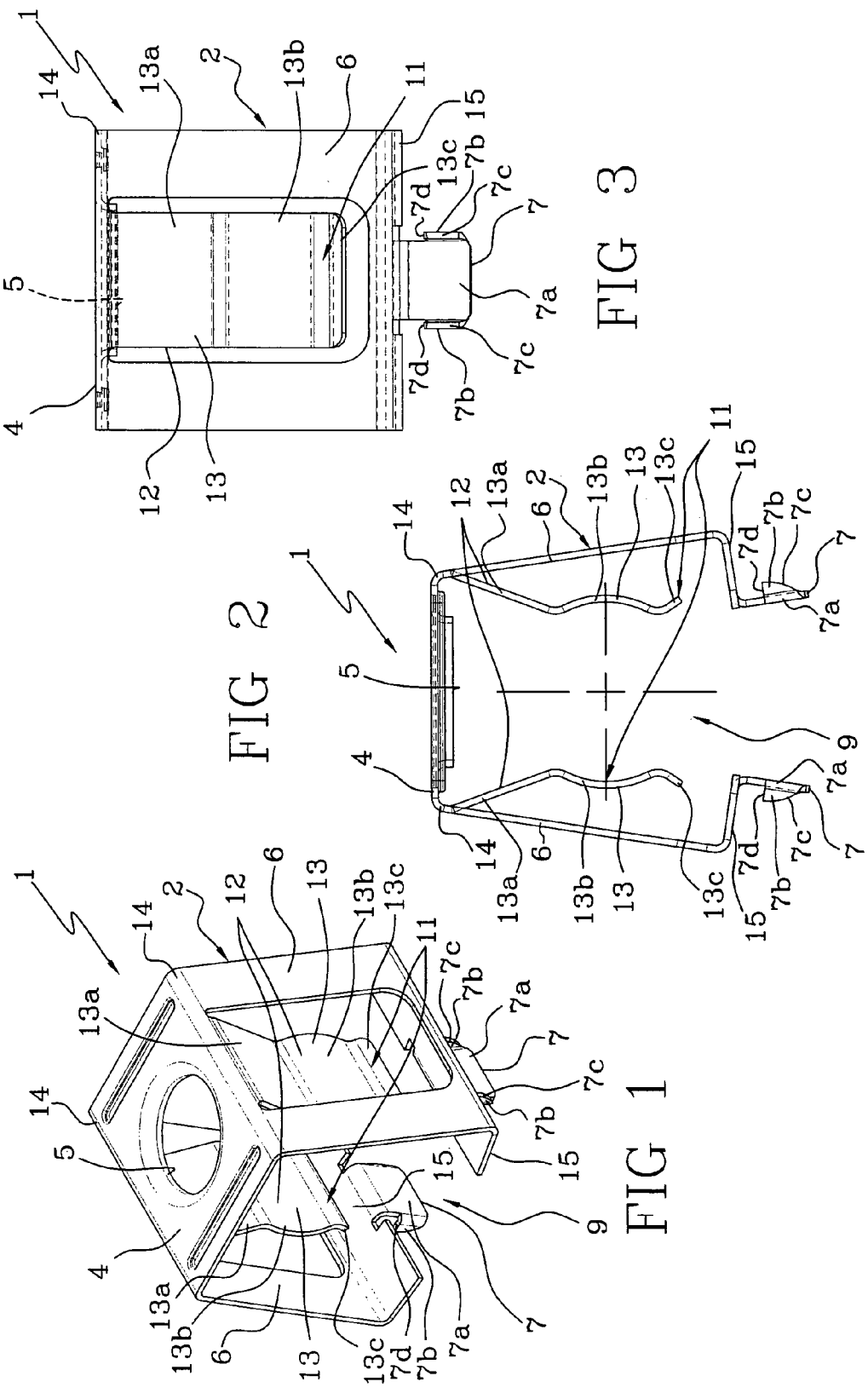

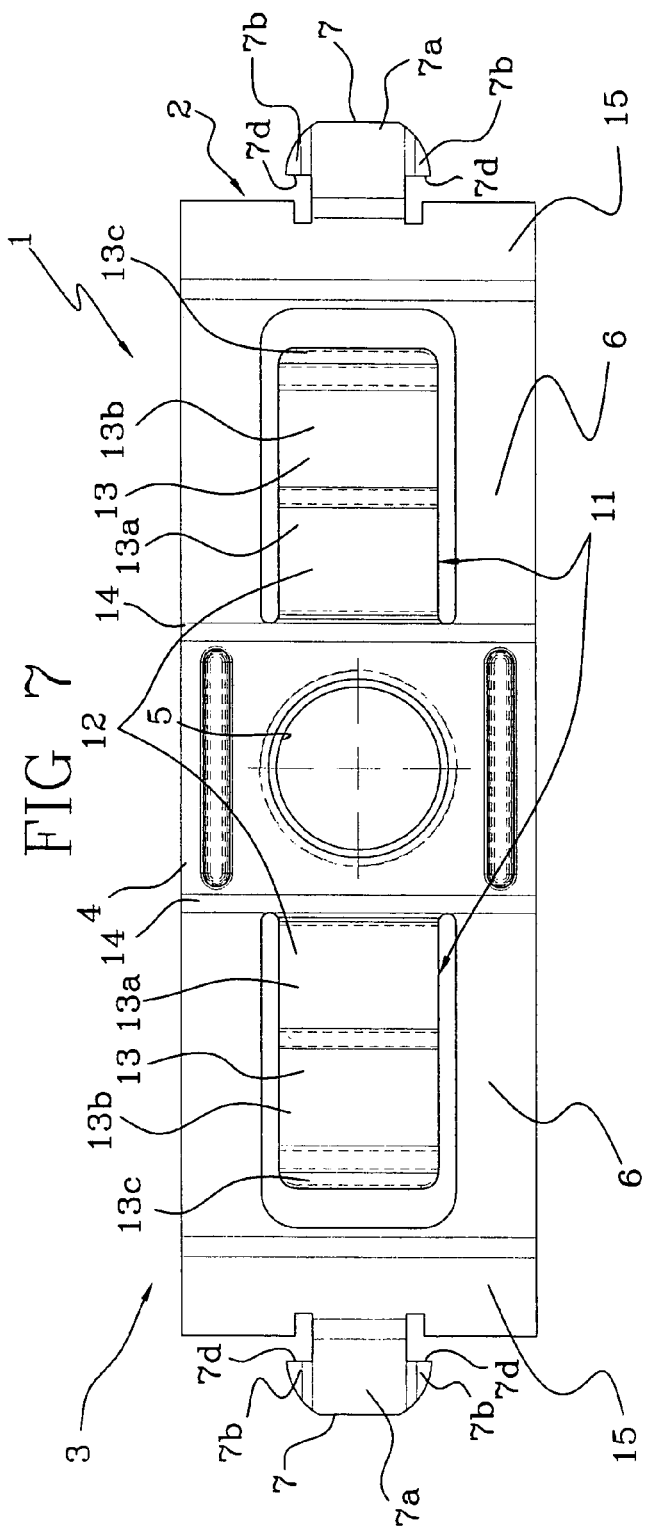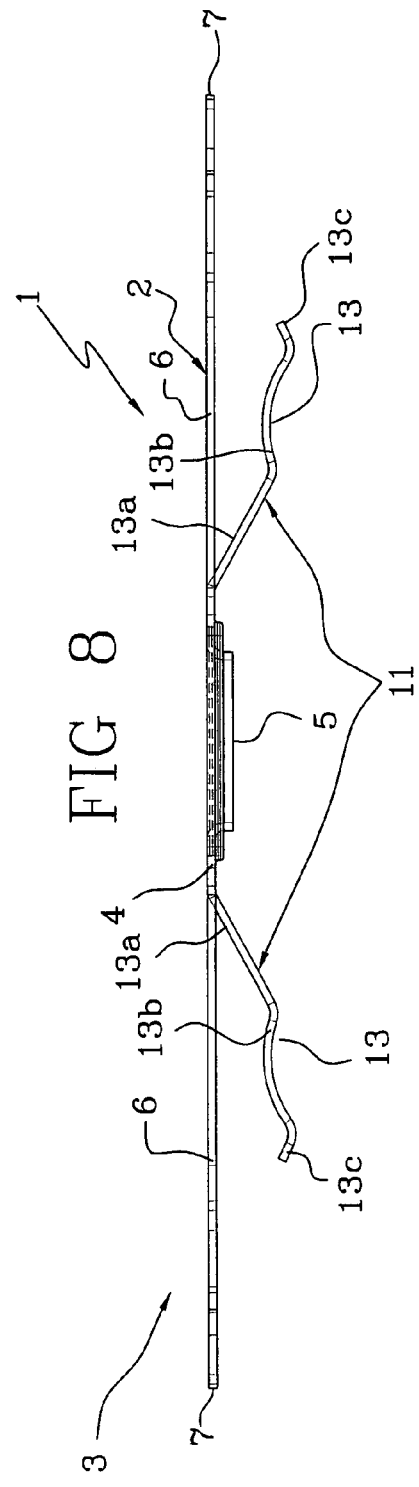

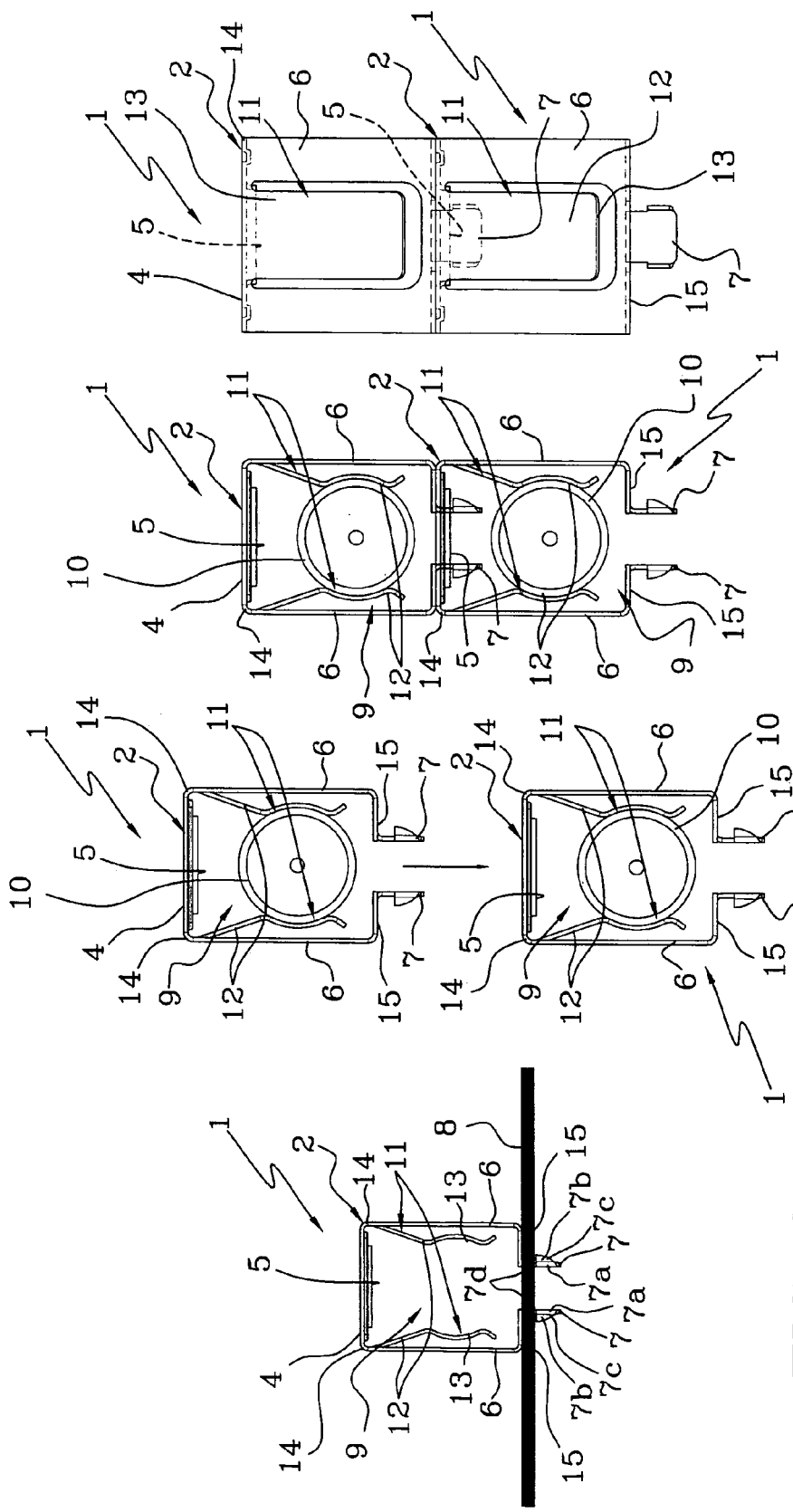

SUPPORT COLLAR FOR LONG ARTICLES, IN PARTICULAR CABLES, PIPES AND/OR THE LIKE

The present invention relates to a support collar for long articles, in particular cables, pipes and/or the like.

The subject of the present invention is suitable for use in the telecommunications and building sector and, in particular, is intended to support cables, pipes and/or similar articles with a long shape.

As is known, the supporting of cables or pipes is usually performed with the aid of a plurality of support collars which can be rapidly fixed onto corresponding support structures normally consisting of special plates with holes.

The aforementioned support collars generally have relatively elastic structures which are formed by means of respective open profiles. According to these configurations, the support collars may be splayed elastically so that they can be rapidly fitted onto the pipes or tubes to be supported.

The document U.S. Pat. No. 6,161,804 describes and illustrates a support collar which has a sheet-like structure provided with a curved portion intended to engage with the cable or pipe to be supported. Two plate-like portions terminating in respective engaging elements extend laterally from the curved portion.

The plate-like portions and the curved portion delimit a respective area for housing the cable or pipe to be supported, which is suitably fixed in a stable position by two or more retaining lugs which extend from the said plate-like portions.

The engaging elements are designed to be inserted inside a respective hole formed through the support plate of a respective support structure. Once the engaging elements have been inserted inside the respective hole, the engaging elements remain locked in this position by respective contact surfaces which engage with the support plate on the opposite side to the curved portion. The disengagement of the collar from the support plate requires firstly the movement of the engaging elements towards each other and then extraction thereof through the respective hole in the support plate.

According to a further example described and illustrated in the document U.S. Pat. No. 6,354,543, the support collar has a flat top end portion which has a hole in the centre. The central hole allows engagement and fastening of another support collar in positions on top of each other, while the flat surface of the top end portion provides a stable resting surface for the mounted support collar.

In this case also, engagement of one support collar on another one is able to be performed by means of insertion of respective engaging elements which hook onto the corresponding top end portion through the central hole, while disengagement is performed by moving the engaging elements towards each other until they can be extracted through the central hole of the respective top end portion.

Also known are collars which are formed in the manner of a clip and can be deformed elastically so as to fix cables or pipes to respective support structures.

In particular, these collars comprise a substantially flat engaging portion which is screwed directly to the support structure and fixed onto the latter by means of at least one locking screw. Two side portions extend from the flat portion and delimit a narrow intermediate space suitable for receiving the cable or pipe to be supported. The side portions can be splayed elastically so as to allow the introduction of the cable or pipe inside the intermediate space. Retention of the cable or pipe to be supported is performed by the side portions of the support collar which press transversely the respective article to be supported.

Despite the fact that the aforementioned support collars are able to support long articles, such a cables, pipes and/or the like, the Applicant has found that, however, they are not without a number of drawbacks and that various aspects may be improved, mainly in connection with the stability of the articles supported, the flexibility of use of the support collars with respect to the different cross-sections and/or cross-sectional forms of the cables or pipes to be supported, the elasticity of the side walls and, consequently, the adaptability thereof to cables or pipes with large cross-sections, the practicality of application of the support collars on cables or pipes, the simplicity of installation thereof, the positioning thereof along the cables or pipes to be supported, the amount of material required for manufacture thereof, as well as the costs for manufacture and/or marketing thereof.

In particular, as regards the support collars which can be engaged on the support plates or other collars by means of corresponding engaging elements, the Applicant has found that the plate-like side portions of the latter are excessively rigid. The rigidity of the plate-like side portions is due to their configuration in the form of a hump or with curved sections, necessary for housing cables or pipes with a circular cross-section.

In addition, the plate-like side portions are provided with respective structural folds which define the undulating profile thereof, rigidifying significantly the structure.

The excessive structural rigidity limits substantially the capacity of the known collars to adapt to the different forms and dimensions of the cables or pipes to be supported. Therefore, each support collar may be applied only on cables or pipes which have transverse dimensions corresponding to the transverse dimensions of the housing area intended for them.

It must also be mentioned that the manufacture of a structure provided with a series of curved portions requires, on the one hand, the implementation of complex method and, on the other hand, the use of a significant quantity of material which increases substantially both the overall production costs and the costs for marketing of these support collars.

With reference instead to the collars formed in the manner of a clip these have the drawback that they have an open side through which accidental extraction of the mounted cable or pipe may occur. In greater detail, since it has an open form, the clip is unable to retain the mounted cable or pipe in the event of accidental separation from the side portions of the collar. In other words, when the mounted cable accidentally disengages from the side portions of the collar, it separates completely from it, with dangerous consequences.

The object of the present invention is to propose a support collar for long articles, in particular cables, pipes and/or like, able to solve the problems encountered in the prior art.

In particular, one object of the present invention is to propose stackable support collars which ensure stable fixing in position of cables or pipes.

A further object of the present invention is to propose a stackable support collar which is able to adapt to the different forms and cross-sections of cables or pipes to be supported.

An object of the present invention is to propose a support collar of the stackable type, the structure of which can be deformed elastically depending on the article to be supported.

An object of the present invention is to simplify the method for manufacturing support collars.

A further object of the invention is to reduce the costs for production and marketing of the support collars.

Yet another object of the present invention is to provide a support collar of the stackable type which can be easily applied to the cables or pipes to be supported.

A further object of the invention is to propose a support collar which can be easily installed.

Finally an object of the invention is to provide a support collar of the stackable type which is simple to position along the longitudinal extension of the cables or pipes to be supported.

The objects mentioned, together with others, are substantially achieved by a support collar for long articles, in particular cables, pipes and/or the like, in accordance with that expressed in the accompanying claims.

The description of a preferred, but not exclusive embodiment of a support collar for long articles, in particular cables, pipes and/or the like, is now provided by way of example, where:

FIG. 1 is a perspective view of a support collar for long articles, which is partly splayed, in accordance with the present invention;

FIG. 2 is a front view of the support collar according to the preceding figure:

FIG. 3 is a side view of the support collar according to the preceding figures;

FIG. 7 is a plan view of the planar extension of the support collar according to the preceding figures;

FIG. 8 shows an elevation view of the planar extension of the support collar according to FIG. 7;

FIG. 9 is a front schematic view of the support collar according to the preceding figures engaged on a support plate;

FIG. 10 is a front schematic view of two support collars during stacking;

FIG. 11 is a front schematic view of the two support collars according to FIG. 10, stacked on top of each other;

FIG. 12 is a side view of the stacked support collars according to FIG. 11.

Figure 4:
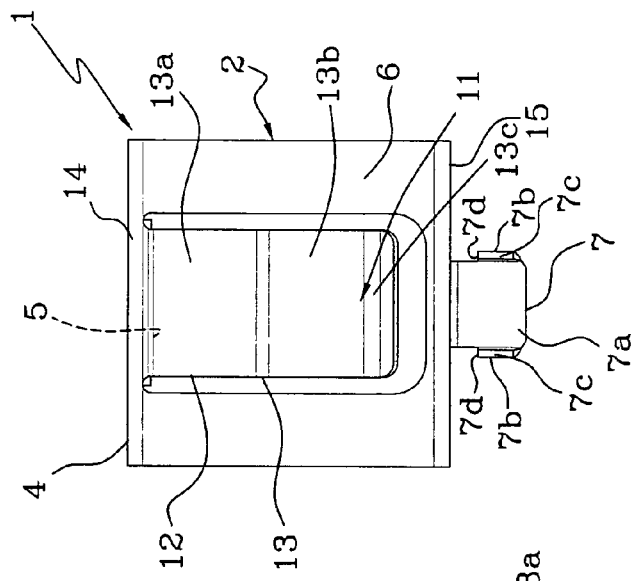
FIG. 4 is a perspective view of the support collar according to the preceding figures, shown in the customary configuration, i.e. not splayed.

With reference to the accompanying figures, 1 denotes in its entirety a support collar for long articles, in particular cables, pipes and/or the like in accordance with the present invention.

As can be seen in the accompanying figures, the support collar 1 comprises a substantially sheet-like structure 2 formed by means of shearing and folding of a corresponding plate 3 (FIGS. 7 and 8), preferably made of steel.

It is possible, however, for the support collar 1 according to the present invention to be made, for example by means moulding of a plastic material, which is preferably flexible, elastic and resistant.

The sheet-like structure 2 comprises a substantially flat top-end portion 4 which has, preferably, in a central position, at least one through-opening 5.

According to the embodiment shown in the accompanying figures, the opening 5 in the top end portion 4 has a circular shape which is delimited by a structural depression in the top end portion 4. However, it must be mentioned that the form of the opening 5 in the top end portion 4 does not limit in any way the invention, operation of which is effective also with openings 5 which have a shape different from that shown, for example, a rectangular shape, square shape, elliptical shape and the like.

Still with reference to the accompanying figures, two side portions 6 extend laterally from the top end portion 4 and each terminate in a respective engaging element 7.

Advantageously, the side portions 6 extend substantially perpendicularly with respect to the top end portion 4, with a substantially planar extension, so as to define an open profile which is substantially square-shaped and preferably substantially rectangular and even more preferably in the form of an overturned U.

Obviously, the embodiment of the side portions 6 shown in the figures and described in detail does not limit in any way the present invention which may envisage support collars 1 provided with side portions 6 directed obliquely with respect to the top end portion, or side portions 6 which are curved with the concavity directed towards the housing area 9 or outwards.

In particular, each side portion 6 does not have intermediate folds in order to provide the sheet-like structure 2 of the support collar 1 with sufficient elasticity in the directions transverse to the side portions 6. In this way the sheet-like structure 2 is free to flex in relation to the stresses which may arise.

The purpose of the aforementioned engaging elements 7 is to ensure, on the opposite side to the top end portion 4, joining of the support collar 1 to a support plate 8 (FIG. 8) or to any other support structure (not shown) or to a top end portion 4 of another support collar 1 in a stacked and superimposed arrangement.

Figure 5:
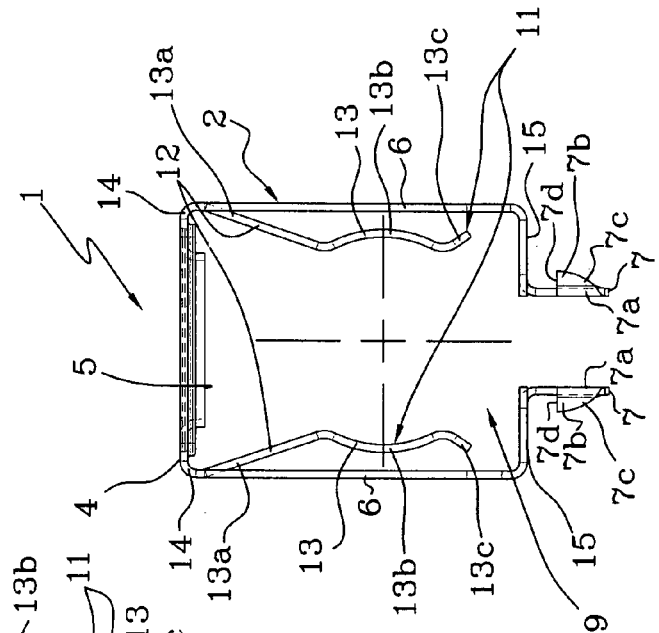
FIG. 5 shows a front view of the support collar according to FIG. 4.
Figure 6:
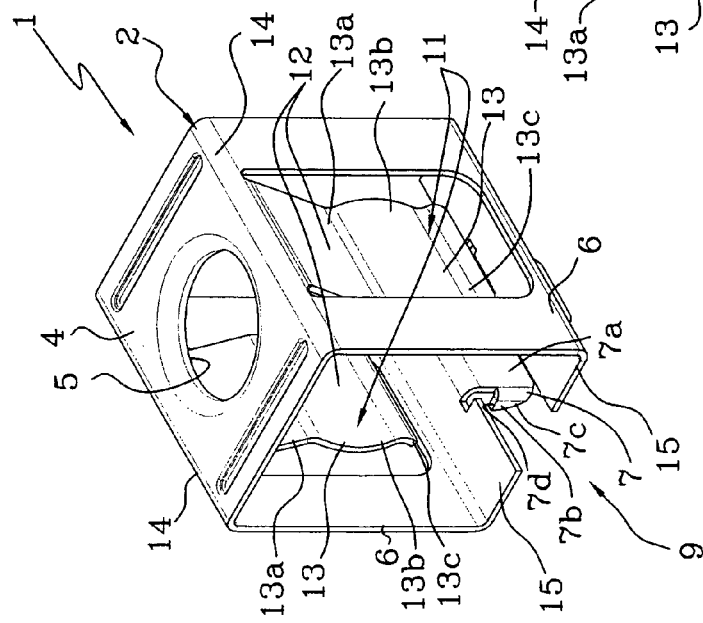
FIG. 6 is a side view of the support collar according to FIGS. 4 and 5.

With reference to FIGS. 1, 2, 4, 5 and 9 to 12, the side portions 6 and the top end portion 4 of each support collar 1 delimit an area 9 for partially housing a long article 10 (FIGS. 10 and 11) to be supported, such as, for example, an electric cable, ducting, a pipe, a bar or any other object with a long form.

Advantageously the support collar 1 comprises retaining means 11 operating within the housing area 9 so as to keep the long article 10 in a stable position.

Preferably, the retaining means 11 comprise at least one retaining clip 12 provided with two gripping arms 13 which extend inside the housing area 9.

The gripping arms 13 can be deformed elastically so as to receive in engagement, inside the housing area 9, the respective long article 10 to be supported.

In detail, the gripping arms 13 can be splayed elastically so as to retain the long article 10, exerting transversely on the latter a pressure sufficient to keep it in a stable position.

Advantageously each gripping arm 13 of the retaining clip 12 is formed from the structure of a respective side portion 6 of the support collar 1.

As can be seen in FIGS. 1, 2, 4, 5 and 9 to 12, each gripping arm 13 extends inside the housing area 9 from a respective edge 14.

In accordance with the embodiment shown in FIGS. 1, 2, 4, 5 and 9 to 12, each gripping arm 13 extends from a respective edge 14 situated between the top end portion 4 and a corresponding side portion 6.

It must be pointed out, however, that operation of the retaining clip 12 is not dependent in any way on the embodiment shown and that it may be designed such that the gripping arms 13 forming the gripping clip 12 extend from corresponding edges arranged on the opposite side to the top end portion 4, in the region of the respective engaging elements 7.

In addition, it is also possible for the gripping arms 13 which form the retaining clip 12 to extend inside the housing area 9 directly from the side portions 6 or from the top end portion 4 adjacent to the opening 5 in the latter.

With particular reference to the structure of the retaining clip 12, each gripping arm 13 has a first substantially flat segment 13a extending from a respective edge 14 of the sheet-like structure 2 of the support collar 1 towards the centre of the housing area 9. A second segment 13b also extends from the first segment 13a, said segment being curved and preferably with its concavity directed towards the centre of the housing area 9 in order to provide a suitable surface for supporting the outer surface of the long article 10 to be supported. On the opposite side to the first segment 13a, a third substantially flat segment 13c extends from the second segment 13b away from the centre of the housing area 9 so as to define a receiving portion for insertion and engagement of the long article 10 to be supported.

Advantageously, as can be seen from the accompanying figures, the function, performed by the retaining clip 12, of retaining the long article 10 is independent of and not conditioned by the function, performed by the support collar 1, of engagement with the support plate 8 or with another support collar 1. In other words, the retaining clip 12 ensures engagement of the support collar 1 with the corresponding long article 10 independently of engagement of the support collar 1 with another support collar 1 or with a suitable support structure. In this way, during installation and/or preparation of all the elements needed for installation of the cable or pipe, the operators may mount the support collars 1 on the structure of the long article 10 to be fixed, joining them together stably without having yet fixed the support collars onto the support plate 8.

According to a further advantageous aspect of the present invention, the retaining clip 12 of each support collar 1 transversely constrains the long article 10 to the respective support collar 1, leaving them free to slide longitudinally with respect to each other. More particularly, once the support collar 1 has been mounted on the long article 10 to be supported, the support collar 1 may slide thereon so as to be positioned along the longitudinal extension of the article 10 according to the installation requirements, thereby facilitating considerably said installation work.

Still with reference to the accompanying figures, the engaging element 7 of each side portion 6 of the support collar 1 extends from a respective locating surface 15 which extends substantially parallel to the top end portion 4 with a substantially flat extension so as to ensure stable mounting of the support collar 1 on the support plate 8 or on a top end portion 4 of another support collar 1. Each locating surface 15 can therefore be arranged against a corresponding surface of the support plate 8 or top end portion 4 of another support collar 1.

With particular reference to the engaging elements 7, each of them comprises at least one plate 7a projecting transversely, preferably perpendicularly, from the corresponding locating surface 15 on the opposite side to the top end portion 4. Each engaging element 7 also comprises at least one pair of wedge-like elements 7b arranged on the sides of the corresponding plate 7a. Each wedge-like element 7b has advantageously an insertion surface 7c inclined relative to the corresponding plate 7a and the locating surface 15, so as to facilitate introduction of the plate 7a through a corresponding through-opening (not shown) formed in the support plate 8 or through the opening 5 in the top end portion 4 of another support collar 1.

Advantageously, each wedge-like element 7b also has a contact surface 7d substantially perpendicular to the respective plate 7a and substantially parallel to the corresponding locating surface 15 so as to remain in contact against a respective locating surface of the support plate 8 or the top end portion 4 of another support collar 1.

The support collar 1 in accordance with the present invention solves the problems encountered in the prior art and achieves important advantages.

Firstly, the arrangement of the retaining clip 12 inside the housing area 9 of the sheet-like structure 2 means that engagement of the support collar 1 with the respective cable or pipe to be supported is not conditioned by engagement of the support collar with the support plate 8 or with another support collar 1. Basically, joining of the support collar 1 to the cable or to the pipe to be supported may be performed independently of fixing of the support collar 1 to any support structure. In this way, during preparation of the installation work, the support collars 1 may be easily fitted on the cable or the pipe to be supported without performing permanent fixing thereof, said operation being able to be performed subsequently by simply force-fitting the engaging elements 7 inside the through-openings in the support plate 8 or the through-openings 5 in the top end portions 4 of other support collars 1.

It must also be considered that the constraining action provided by the retaining clip 12 of each support collar 1 joins the respective support collar to the pipe or cable to be supported only transversely with respect to its longitudinal extension, leaving it free to slide thereon. This characteristic feature is particularly advantageous during the installation operations where longitudinal sliding of the support collars 1 on the cable or pipe to be supported allows rapid alignment of the engaging elements 7 with the respective through-openings in the support structure to be used.

It must also be considered that the presence of side portions without structural folds imparts a greater degree of elasticity to the sheet-like structure 2. In this way the support collar can be easily adapted to different forms and/or sizes of the cables or pipes to be supported. In particular, the support collar according to the present invention is suitable for supporting both collars having a cross-section which may vary from rounded (circular or elliptical) profiles to square-shaped (rectangular or square) profiles and thicknesses varying from narrow to wide cross-sections.

It must also be considered that the elimination of the folds from the side portions results in a significant saving in the amount of material used for manufacture of the support collars, with a corresponding reduction in the overall costs for production and marketing thereof.

The invention claimed is:

1. A first support collar, comprising:
   a substantially sheet-like structure including a top end portion having at least one opening;
   two side portions extending transversely from said top end portion and each having at least one respective engaging element configured to engage said first support collar to at least one of a support plate or a second top end portion of a second support collar, said two side portions and said top end portion of said first support collar delimiting a housing area configured to partially house a long article; and
   a retainer disposed within said housing area, the retainer configured to keep said long article in a stable position inside said housing area,
   wherein the retainer includes at least one retaining clip provided with two gripping arms extending inside said housing area, said gripping arms configured to elastically engage with the long article and to retain the long article inside said housing area, based on an elastic pressure exerted transversely with respect to a longitudinal extension of said long article,
   wherein each of said gripping arms extends into said housing area from a respective area of attachment proximate to the top end portion of the sheet-like structure in a direction from said top end portion and toward an at least one respective engaging element, and wherein the engaging element of each side portion of said first support collar extends from a respective locating surface of a respective side portion, the locating surface of each side portion extending substantially parallel to said top end portion with a substantially flat extension configured for stable mounting of said first support collar on at least one of said support plate or the second top end portion of the second support collar.

2. The first support collar according to claim 1, wherein each gripping arm of said retaining clip is formed from a structure of a respective side portion of said first support collar.

3. The first support collar according to claim 1, wherein each gripping arm of said retaining clip extends inside said housing area from a respective edge of the substantially sheet-like structure.

4. The first support collar according to claim 1, wherein each of the two gripping arms comprises:
 a first substantially flat segment extending from said sheet-like structure towards a center of said housing area;
 a second segment extending from said first segment, said second segment being curved with a concavity directed towards the center of said housing area;
 a third segment extending from said second segment on an opposite side with respect to said first segment, said third segment being substantially flat and extending away from the center of said housing area so as to define a receiving portion for said long article to be supported.

5. The first support collar according to claim 1, wherein the at least one retaining clip is configured to retain the long article independent of support of the long article provided by at least one of said support plate and the second support collar.

6. The first support collar according to claim 1 wherein said at least one retaining clip of said first support collar constrains said long article transversely with respect to a longitudinal extension of the long article, said long article being longitudinally slidable inside said retaining clip.

7. The first support collar according to claim 1, wherein each side portion of said first support collar extends substantially perpendicularly with respect to said top end portion.

8. The first support collar according to claim 1, wherein each side portion of said first support collar extends from said top end portion with a substantially flat extension, each side portion being devoid of intermediate folds.

9. The first support collar of claim 1, wherein the top end portion is substantially flat.

10. The first support collar of claim 1, wherein the at least one opening of the top end portion is disposed in a central location of the top end portion.

11. The first support collar of claim 1, wherein the two side portions includes a first side portion and a second side portion, and wherein the at least one respective engaging element includes a first engaging element and a second engaging element, further comprising:
 the first engaging element being formed from the first side portion; and the second engaging element being formed from the second side portion.

12. The first support collar of claim 1, wherein a first gripping arm of said gripping arms extends from a first edge of the top end portion into the housing area, and wherein a second gripping arm of said gripping arms extends from a second edge of the top end portion into the housing area.

13. The first support collar of claim 1, wherein the respective area of attachment proximate to the top end portion of the sheet-like structure includes a respective area of attachment of each of said gripping arms to a respective edge of the top end portion.

14. The first support collar of claim 1, wherein the respective area of attachment of each of said gripping arms proximate to the top end portion of the sheet-like structure includes a respective area of attachment of each of said gripping arms to the top end portion of the sheet-like structure.

15. The first support collar of claim 1, wherein the respective area of attachment includes a respective area of attachment of each of said gripping arms to at least one of said two side portions proximate to the top end portion of the sheet-like structure.

* * * * *